United States Patent
Zhou et al.

(10) Patent No.: US 8,462,656 B2
(45) Date of Patent: Jun. 11, 2013

(54) METHOD AND APPARATUS FOR MULTI-SERVICE ADAPTATION AND CARRIAGE

(75) Inventors: Jianlin Zhou, Shenzhen (CN); Yang Cao, Shenzhen (CN); Xing Hu, Shenzhen (CN); Shimin Zou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 164 days.

(21) Appl. No.: 13/037,139

(22) Filed: Feb. 28, 2011

(65) Prior Publication Data

US 2011/0150463 A1   Jun. 23, 2011

Related U.S. Application Data (63) Continuation of application No. PCT/CN2009/071924, filed on May 22, 2009.

(30) Foreign Application Priority Data

Aug. 26, 2008 (CN) .......................... 2008 1 0146903

(51) Int. Cl.
*H04L 1/00* (2006.01)
*H04L 12/26* (2006.01)

(52) U.S. Cl.
USPC .......................................................... 370/252

(58) Field of Classification Search
None
See application file for complete search history.

(56) References Cited

U.S. PATENT DOCUMENTS

| | | | |
|---|---|---|---|
| 7,809,017 B2 * | 10/2010 | Harley et al. | 370/474 |
| 8,190,026 B2 * | 5/2012 | Luo et al. | 398/58 |
| 2004/0202470 A1 | 10/2004 | Lim et al. | |

FOREIGN PATENT DOCUMENTS

| | | |
|---|---|---|
| CN | 1536812 A | 10/2004 |
| CN | 1601982 A | 3/2005 |
| CN | 1842221 A | 10/2006 |
| CN | 1859382 A | 11/2006 |
| CN | 1953353 A | 4/2007 |
| CN | 1980106 A | 6/2007 |
| CN | 101102157 A | 1/2008 |
| CN | 101212821 A | 7/2008 |
| EP | 2 019 519 A1 | 1/2009 |
| WO | WO 2007/051488 A1 | 5/2007 |

OTHER PUBLICATIONS

International Search Report issued Aug. 27, 2009 in connection with International Patent Application No. PCT/CN2009/071924.
Written Opinion of the International Searching Authority dated Aug. 27, 2009 in connection with International Patent Application No. PCT/CN2009/071924.
Supplementary European Search Report dated Sep. 28, 2011 in connection with European Patent Application No. EP 09 80 9191.
Translation of Office Action dated Apr. 20, 2011 in connection with Chinese Patent Application No. 200810146903.5.

* cited by examiner

*Primary Examiner* — Ayaz Sheikh
*Assistant Examiner* — Blanche Wong (57) ABSTRACT

A method and an apparatus for multi-service adaptation and carriage, comprising: mapping at the service adaptation layer different types of services into uniform enhanced Gigabit Passive Optical Network Encapsulation Method (E-GEM) frames; combining at the channel layer E-GEM frames encapsulating the same type of services into the same type of T-CONT frames; setting a priority for each type of T-CONT; guaranteeing bandwidth for T-CONT frames with high priority and preferentially sending it.

6 Claims, 8 Drawing Sheets

METHOD AND APPARATUS FOR MULTI-SERVICE ADAPTATION AND CARRIAGE

CROSS-REFERENCE TO RELATED APPLICATIONS

This application is a continuation of International Application No. PCT/CN2009/071924, filed on May 22, 2009, which claims priority to Chinese Patent Application No. 200810146903.5, filed on Aug. 26, 2008, both of which are hereby incorporated by reference in their entireties.

TECHNICAL FIELD

The present invention relates to the field of data communications, in particular to a method and an apparatus for multi-service adaptation and carriage.

BACKGROUND

With the development of network communication technologies, current networks can carry various types of services, such as audio, video, network game, and net browsing. In recent years, network bandwidth demands have increased at an exponential rate. Though the operators have increased the capabilities of networks carriage and data transmission by continuously increasing physical bandwidth and developing relevant technologies, the increase in physical bandwidth always lag behind the demands of users for data transmission. Confronting the problem about huge amount of data, people have conducted many researches on how to ensure the reliability of transmission and Quality of Service (QoS) of multiple services when the network carries the multiple services. In the latest two years, operators generally select Gigabit-Passive Optical Network (GPON) as the solution for future big bandwidth optical fiber access (Fiber to The Building/Cabinet/Curb/Home, and FTTx for short). This poses a higher requirement for the bandwidths of the metropolitan area networks. In addition, it requires that the metropolitan area networks have the capabilities of interfacing with GPON, which supports the development of future FTTxs.

Current metropolitan area networks can be classified into many types, such as Next Generation Synchronous Digital Hierarchy (NG-SDH), Metro Wavelength Division Multiplexing (Metro-WDM), and Layer 2 Ethernet. Current metropolitan area networks have at least the following problems: coexistence of multiple ways of transmission, excessive types of carriage technologies, poor transparency of services, lack of dynamic control protocols, difficult management and maintenance, lack of real time dynamic bandwidth adjustment mechanism, low utilization of network bandwidth, no strict QoS guarantee, and difficulty of satisfying big Bandwidth on Demand (BOD) services. To sum up, a relatively simple technology is urgently required in the prior art. In such a technology, it is capable of carriage multiple future services, convenient to interface with GPON, easy to carry out uniform adaptation of multiple services with dynamically allocated bandwidths, and capable of achieving channel carriage according to QoS characteristics.

SUMMARY

The embodiments of the present invention provide a method and an apparatus for multi-service adaptation and carriage to easily and conveniently achieving uniform adaptation of multiple services and meet the QoS requirements of various types of services.

A method for multi-service adaptation and carriage provided by the embodiments of the present invention comprises:

at the service adaption layer, mapping different types of services into uniform Enhanced Gigabit-Passive Optical Network Encapsulation Method (E-GEM) frames;

at the channel layer, combining the E-GEM frames with the same type of service into transport-container (T-CONT) frames of the same type;

setting a priority for each type of T-CONT frames; and guaranteeing bandwidth for T-CONT frames with high priority and preferentially sending it.

An apparatus for multi-service adaptation and carriage provided by the embodiments of the present invention comprises:

a service adaptation unit, configured to: at the service adaption layer, encapsulate and decapsulate different types of service uniformly, wherein the encapsulation comprises mapping different types of service into different E-GEM frames;

a channel processing unit, configured to combine at the channel layer the E-GEM frames with the same type of service into T-CONT frames of the same type;

a priority setting unit, configured to set a priority for each type of T-CONT frames; and a transmission unit, configured to guarantee bandwidth for T-CONT frames with high priority and preferentially sending it.

It can be seen from the technical solutions provided by the above embodiments of the present invention that, the method and apparatus of the embodiments of the present invention for multiple-service adaptation and carriage can easily and conveniently achieving uniform adaptation of multiple services and satisfy the QoS requirements of various types of service, by mapping at the service adaptation layer different types of services into uniform E-GEM frames, combining at the channel layer E-GEM frames with the same type of service into transport frames of the same type, setting priorities for various types of T-CONT frames, and guaranteeing bandwidth for T-CONT frames with high priorities and preferentially sending them.

DETAILED DESCRIPTION

The method for multi-service adaptation and carriage according to the embodiments of the present invention performs uniform adaptation of different types of services and carries these services in a granularity-adjustable channel carriage fashion according to different QoS requirements of these services. In particular, at the service adaptation layer, it maps different types of services into different E-GEM frames; at the channel layer, combines E-GEM frames of the same type into a transport frame T-CONT; sets priorities for the T-CONT frames; and guarantees bandwidth for the T-CONT frames with high priority and preferentially sends them.

To enable those skilled in the art better understand the solutions of the embodiments of the present inventions, a detailed description of the embodiments is provided with reference to the accompanying drawings.

Figure 1:
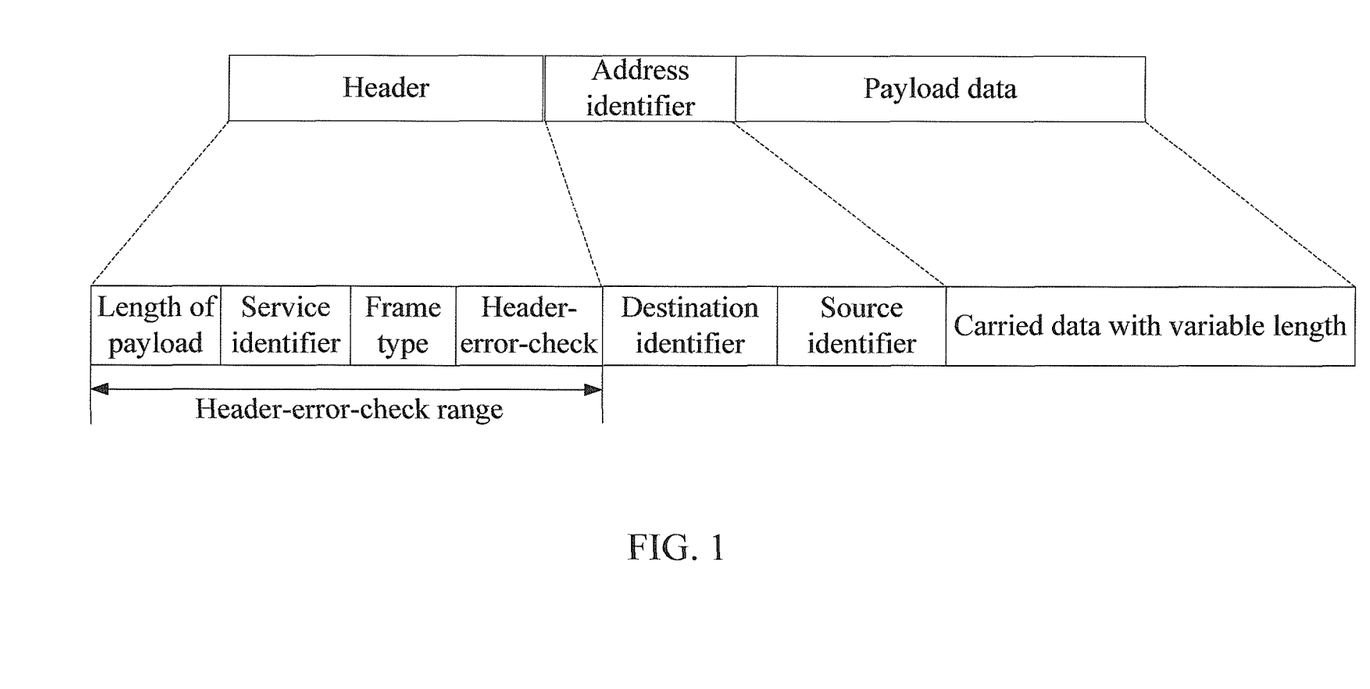
FIG. 1 is a schematic diagram of the format of an E-GEM frame at the service adaptation layer according to an embodiment of the present invention.

First, refer to FIG. 1 which illustrates the format of an E-GEM frame at the service adaptation layer according to the embodiments of the present invention.

The format of the E-GEM frame includes the following three parts: a frame header, an address identifier, and a payload portion. The frame header includes these four fields: a length of payload field, a service identifier field, a frame type field, and a header-error-check field. The address identifier can be classified into destination identifier and source identifier. In the following, each part of the format is described in detail.

Frame header: It comprises these four fields: a length of payload field, a service identifier field, a frame type field, and a header-error-check field. To facilitate determining the start position of the frame, the length of each field in frame header can be fixed (e.g., a length of 5 bytes). The meaning of each field is as follows:

length of payload: length of the payload data, counted in bytes;

service identifier: an identifier for a service at a network node, for example, possibly corresponding to a specific service type and physical port;

frame type: used to indicate the intermediate frame or the final frame when some data packet with excessive length of data needs to be encapsulated into and carried in multiple frames; and header-error-check: used for CRC check of data of the fields in the frame header.

Address identifier: comprising destination identifier and source identifier. The destination identifier denotes the terminating point of a service in the network. The source identifier denotes the initiating point of a service in the network. The length of this address identifier field also can be fixed, for example, the lengths of both the destination identifier and the source identifier can be fixed to 2 bytes.

A simple identifying method can use a network node identifier, which can be used along with the service identifier for uniquely identifying a service within the network. For example, if there are 16 nodes in a network, the identification range will be 0-15.

In addition, to accommodate increased amounts of services and more extensive applications, in addition to the network node identifier, one more service identifier can be added to the address identifier based on the service identifier of the frame header, so that the network node identifier, the service identifier expanded in the address identifier, and the service identifier of the frame header can uniquely identify a service in the network. For example, classify the address identifier domain into two identifier domains: a network node identifier (Node-ID) domain and a branch port identifier (TI-ID) domain, plus the service identifier (Port-ID) of the frame header. As such, Node-ID plus TI-ID plus Port-ID can hierarchically specify every service in the network.

That is, every service in the network has a unique identifier to facilitate the network administrator or the host to configure, track and manage the services.

Payload: The length of this field can be varied, which depends on the numerical range of the length of the payload portion in the frame header.

When the length of the payload is 0, it indicates that this is an idle frame. It is not necessary to provide an address identifier section for an idle frame to ensure that the idle frame has a minimum length. This can permit more flexibility to fill the vacant time slots between valid frames.

For a big bandwidth service, if the maximum value of the length of payload cannot accommodate it, the service can be fragmented into multiple frames, which will be indicated by frame type in the frame header.

As can be seen from the above format of the E-GEM frame, compared with the GEM frame in the GPON architecture, a destination identifier and a source identifier are added to the format of the E-GEM frame of the embodiments of the present invention. Further, unlike the GPON architecture, the presence of the service identifier is not limited to an Optical Line Terminal (OLT) and an Optical Network Unit (ONU) within a GPON system. The service identifier in the format of the E-GEM frame of the present embodiments of the present invention has already been expanded to a broader networking scope. For example, it can present between any nodes in the network. Combined with the destination identifier and the source identifier, it can give a unique identifier for a service through the network, thereby facilitating scheduling the services throughout the network, which breaks the limitation of GEM frames being used for merely point to multipoint structures at the access layer.

In practical applications, Time Division Multiplexer (TDM) services, Synchronous Digital Hierarchy (SDH)/Synchronous Optical Network (SONET)/Asynchronous Transfer Mode (ATM) services, and Ethernet data services can be adapted into E-GEM frames. In addition, Transport Multi-Protocol Label Switching (T-MPLS) and Provider Backbone Bridge-Traffic Engineering (PBB-TE) for packet transmission mainstream technologies, and GEM frames of GPON architectures can also be adapted into E-GEM frames. Different types of services are mapped into uniform E-GEM frames and service identifier fields in the frame headers are used for identifying these services. This is described in detail in the following.

Figure 2:
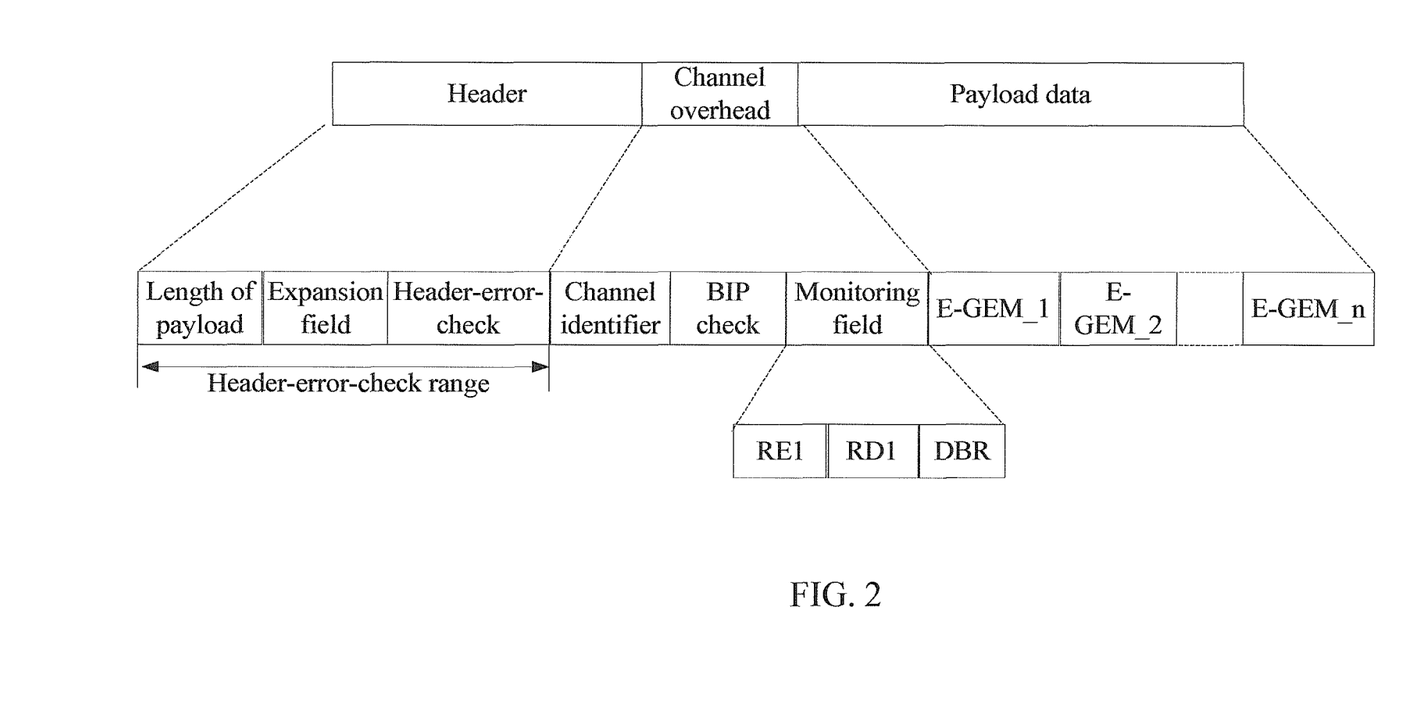
FIG. 2 is a schematic diagram of the format of a T-CONT frame at the channel layer according to an embodiment of the present invention.

Referring to FIG. 2, this figure illustrates the format of a T-CONT frame at the channel layer according to the embodiments of the present invention.

The format of the T-CONT frame comprises a frame header, a channel overhead, and a payload portion. In the following, these three parts are described in detail.

Frame header: It comprises a length of payload field, an expansion field, and header-error-check field. To conveniently determine the start position of the frame, the lengths of the fields in the frame header can be fixed. The meanings of the fields are as follows:

length of the payload: denotes the length of the payload data, counted in bytes;

extension field: can choose relatively important information and can be added into a check of the header, such as a channel identifier; and header-error-check field: used to perform CRC of the data in the fields of the frame header. This check can capture and synchronize the frame header by checking small number of bytes, and can check and correct some relatively important information, such as the length of payload and channel identifier, thereby increasing the reliability of the service transmissions.

Channel overhead: It includes a channel identifier field, a data check field, and a monitoring filed.

The channel identifier is a unique serial number assigned to the T-CONT frames generated by all nodes in a network, and allocated by a host to facilitate positioning, cross connection, monitoring, and management in subsequent transmission.

The data check is used for detecting the quality of data transmission in the channel layer, and is represented using a bit error rate. Signal degradation or signal failure can be determined according to a predetermined threshold of the bit error rate. For example, Bit Interleaved Parity (BIP) can be used to perform a BIP check of the T-CONT frames. The bit error rate can be represented using a block error rate to facilitate monitoring the quality and the performance of data transmission in a data transmission channel consisting of T-CONT frames with the same identifiers.

The monitoring filed can be used to transmit the alerts and performance generated in the channel, and bandwidth request report or other information, thereby achieving an end to end monitoring of alerts and performance directed to the channel. The monitoring filed may comprise remote error indication REI, remote defect indication RDI, and dynamic bandwidth report DBR.

Payload data: The data field in the T-CONT channel layer is used to carry E-GEM frames and is consisted of multiple E-GEM frames. The length of the data field can be varied. Depending on the numerical range of the length of payload in T-CONT frame header, the length of payload is required to be longer than or equal to the sum of the lengths of multiple E-GEM frames.

When the length of payload is zero, the frame is an idle frame and does not carry any E-GEM frame. For an idle frame, it is not necessary to set a channel overhead field to ensure that the idle frame has a minimum length. This permits more flexibility to fill the vacant time slots between valid frames.

When the length of payload is longer than the sum of lengths of multiple E-GEM frames, it can be filled using idle bytes.

It should be explained that the format of the T-CONT frame of the embodiments of the present invention is not limited to the format as described above, it can be another format. For example, a relatively important channel identifier can be placed in the frame header, such as in the expansion field. Thus, the channel identifier can also participate in the header error check, or even error detection and error correction. In this situation, the channel overhead includes a data check and monitoring field.

In addition, to facilitate dynamic bandwidth adjustment, a dynamic bandwidth report can be included in the channel overhead. In a network based on dynamic bandwidth adjustment, first, each node connects the bandwidth requirements of all services within the node. Then, the node sends to a host its bandwidth demand report. The host calculates and makes decisions according to line bandwidth resources currently available in the network, and bandwidth demand, service priority, and service level of each node, etc, and finally distributes bandwidth allocation information to each node. Here, the dynamic bandwidth report (DBR) is used for a node to send a real time dynamic bandwidth demand report to the host.

At the channel layer, the T-CONT frames can be classified into a small number of types, such as Fixed Bandwidth (FB), Assured Bandwidth Best Effort (AB+BE), and Best effort (BE). In carriage E-GEM frames mapped by different services into T-CONT, E-GEM frames of the same type are combined into a T-CONT frame according to principles such as service type, priority, and destination. For example, E-GEM frames of TDM services or private line services can be combined into FB type T-CONT frames; E-GEM frames of Internet Protocol Television (IPTV), Video on Demand (VoD), or private line services can be combined into AB+BE type T-CONT frames, whereas E-GEM frames of webpage browsing and file downloading services can be combined into BE type T-CONT frames. As such, a T-CONT frame with high priority can be assured a bandwidth and be sent preferentially, and a T-CONT frame with low priority can be reallocated with remaining bandwidth, according to line bandwidth resources currently available in the network, bandwidth demand, and service priority of each node, etc, thereby achieving a fair allocation of bandwidth.

Figure 3:
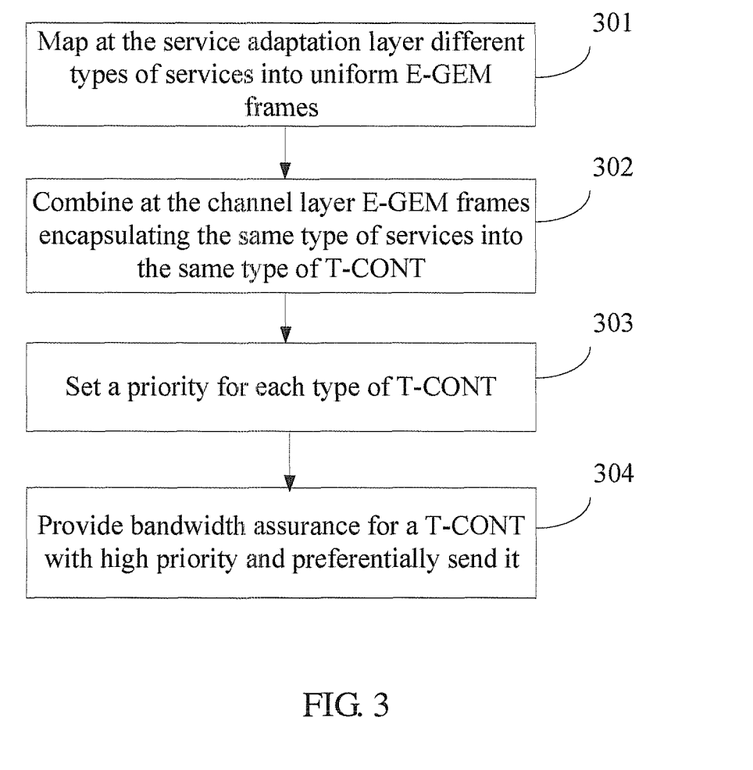
FIG. 3 is a flow chart of a method for multi-service adaptation and carriage according to an embodiment of the present invention.

FIG. 3 shows a flow of the method for multi-service adaptation and carriage according to an embodiment of the present invention. The method includes the following steps:

Step 301: Map at the service adaptation layer different types of services into a uniform E-GEM frame.

Step 302: Combine at the channel layer the E-GEM frames encapsulating same types of services into a transport frame T-CONT of the same type.

Step 303: Set a priority for each type of T-CONT frame.

Step 304: Assure bandwidth for a T-CONT frame with high priority and preferentially send it.

As an embodiment, the E-GEM frame of the embodiment of the present invention can be achieved through improvement of a GEM frame of the GPON architecture.

Figure 4:
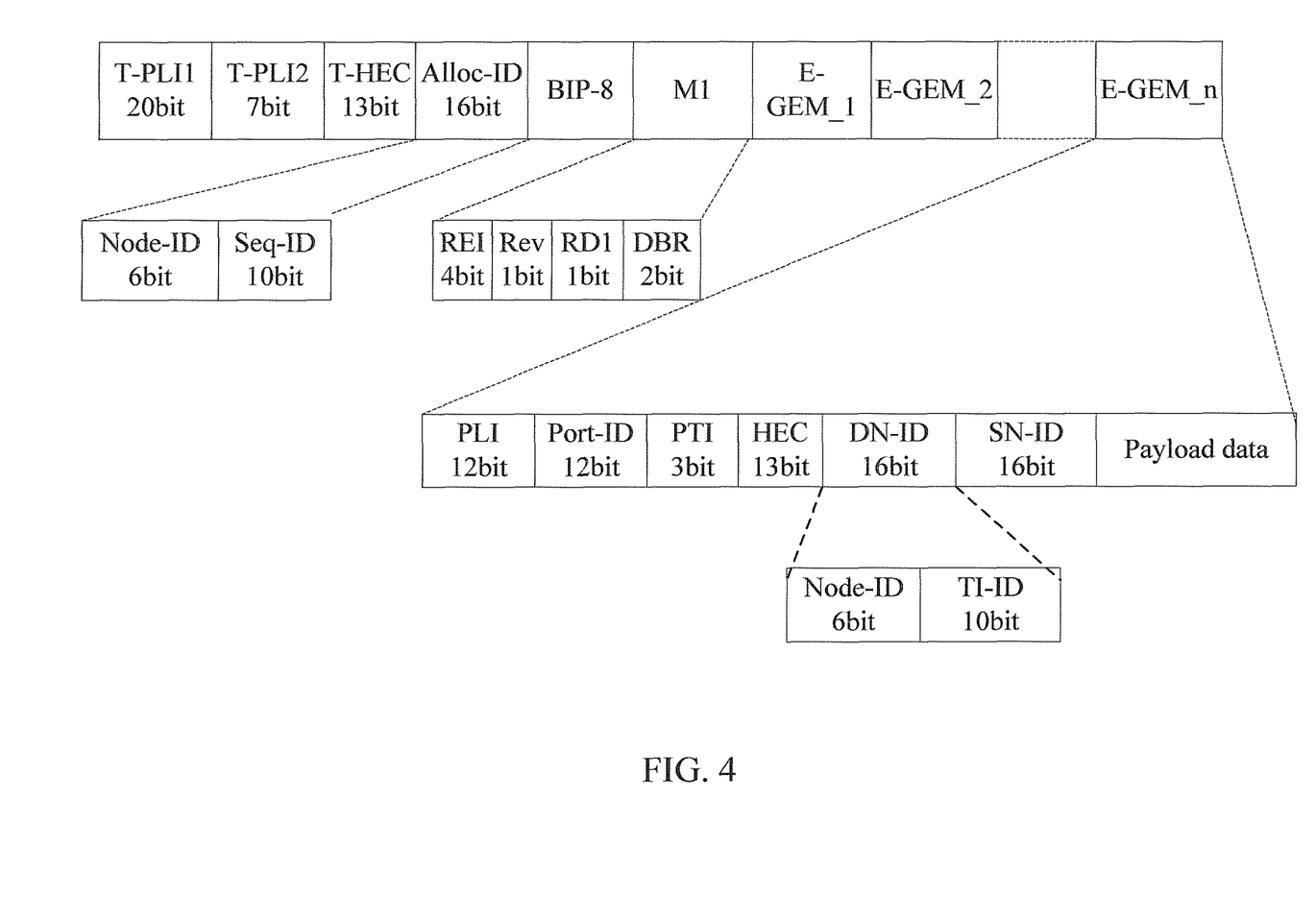
FIG. 4 is a schematic diagram of the structures of an E-GEM frame and a T-CONT frame achieved by improving the GEM frame of GPON architecture according to an embodiment of the present invention.

FIG. 4 shows the structure of an E-GEM frame achieved by improvement of a GEM frame of the GPON architecture and the structure of a T-CONT frame.

(1) Service Adaptation Layer

A. The definition of the frame header can entirely borrow that of the current frame header of the GEM frame header, 5 bytes in total. Fields corresponding to the E-GEM frame header are defined as follows:

Payload length indicator (PLI): 12 bit, used to indicate the length of the payload, counted in bytes. The permitted length of payload data is at most 4095 bytes. If the length of the user data is longer than this maximum length, it needs to be fragmented into pieces less than 4095 bytes for transmission;

Port-ID (service indication): 12 bit; at most 4096 unique service identifiers can be provided;

Payload type indicator (PTI): 3 bit, used to indicate the type of the payload and corresponding processing method, as shown in detail in Table 1;

Header error control (HEC): providing a 13-bit CRC check.

TABLE 1

| PTI | Meaning |
| --- | --- |
| 000 | User data, no congestion, non-final frame |
| 001 | User data, no congestion, final frame |

TABLE 1-continued

| PTI | Meaning |
|---|---|
| 010 | User data, congestion, non-final frame |
| 011 | User data, congestion, final frame |
| 100 | Non-user data, OAM data |
| 101 | Reserved |
| 110 | Reserved |
| 111 | Reserved |

B. On the basis of the GEM frame of GPON architecture, a destination identifier and a source identifier are added. A 16 bit field can be considered and classified into two identifier domains: Node-ID (network node identifier) Gbit, TI-ID (branch terminal identifier) 10 bit. The former indicates that there are at most 64 nodes in the network, and the latter can be used along with Port-ID of the frame header to identify wider ranges of service types. As such, Node-ID plus TI-ID plus Port-ID can uniquely and hierarchically specify each service within the network. For example, TI-ID can correspond to the branch board or port in the network node equipment:

For a GPON branch, there are multiple ODN (Optical Distribution Network) interfaces, each ODN interface may be allocated a TI-ID. Different services belonging to ONUs of the same ODN network are subsequently allocated different Port-IDs;

for a TDM service, such as an E1 service, TI-IDs can be allocated according to different single boards, and then multiple E1 interfaces within the board can be allocated different Port-IDs. It is also possible to directly allocate TI-IDs for all E1 interfaces within the nodes; and for an Ethernet service, the TI-ID can be a physical port, and Port-Id is correspondingly a Virtual Local Area Network (VLAN) identifier.

To sum up, many ways can be adopted to identify services.

C. For the payload data field, its length is specified by PLI and can be varied between 0 and 4095.

(2) Channel Adaptation Layer

A. Apart from the length of payload T-PLI1, the frame header can include other extension identifiers, such as T-PLI2 in the figure. Considering that the bandwidth for a T-CONT channel transmitting data can be up to 2.5 G, 10 G, or even higher data rates, the length of a T-CONT frame can reach 38880 bytes, 155520 bytes, or even larger amount. The indication range of T-PLI1 can be arranged to be 20 bit. T-HEC check can learn from current 13 bit CRC check.

B. In the channel overhead area, it can be contemplated that 2 bytes, i.e., 16 bits are arranged for the channel identifier (Alloc-ID). That is, the channel identifier can be divided into network node identifier (Node-ID) 6 bits and channel serial number (Seq-ID) 10 bits. This means that at most 1024 T-CONT frames can be assembled in one node. Considering that the channel identifier is a very important indication, it can also be provided in the frame header area, such as replacing the extension identifier T-PLI2 and participating check and error-correction of the frame header. Simple BIP-8 check can be used for the data check. The monitoring byte M1 contains a 4 bit remote error indication REI, a one bit remote defect indication RDI, and a 2 bit bandwidth request DBR. The meanings of the DBRs for different data are as follows:

TABLE 2

| DBR | Data type |
|---|---|
| 00 | Normal data |
| 01 | Bandwidth request (8 Bytes) |
| 10 | Reserved |
| 11 | Reserved |

C. For the payload data area, its length is specified by T-PLI1 and it comprises multiple E-GEM frames.

It should be explained that the channel adaptation layer of the embodiment of the present invention is substantially different from the T-CONT frame of the GPON architecture.

In GPON architecture, T-CONT frames are within the range of the access layer, are used in the direction between ONU and OLT, and are suitable for transmissions from multiple points to one point. Proposing the concept of T-CONT in the GPON architecture is mainly for satisfying the QoS requirements of different service types. Except an upstream signaling channel (PLOAMu, Physical Layer OAM Upstream), an upstream power level sequence (PLSu, physical Layer Sequence upstream), and an upstream dynamic bandwidth report (DBRu, Dynamic Bandwidth Report Upstream), no other administrative overheads are defined, such as data check, performance, and alert monitoring. Therefore, it's Operation, Administration, and Management (OAM) capability is relatively poor and hard to implement other functions, such as cross connection, monitoring, and protection, and cannot be applied to wider range of network applications.

In the embodiments of the present invention, the channel layer T-CONT frames maintain a dynamic bandwidth report function and can initiate a dynamic bandwidth allocation request when the bandwidth of the service type as carried varies. In the OAM aspect, a frame head positioning function is added to cater to wider ranges of applications. A data check function and a performance and alert monitoring function are added, which makes it possible to achieve an end to end monitoring and management at the channel layer and achieve the protection and switching at the channel layer. The improved T-CONT frame has more complete OAM functions. In the allocated time slot, it can function as a truly independent transmission channel. In addition, compared with the rigid transport channel Virtual Container (VC) in the SDH architecture, the virtual container has a fixed length and cannot be adjusted. In contrast, the length of the T-CONT frame of the embodiment of the present invention can be varied in the unit of 1 byte and the bandwidth utilization is high. Moreover, it can be combined with the DBA mechanism directed to the whole network to conveniently achieve dynamic bandwidth adjustment and is particularly suitable for future IPTV and BOD services.

Figure 5:
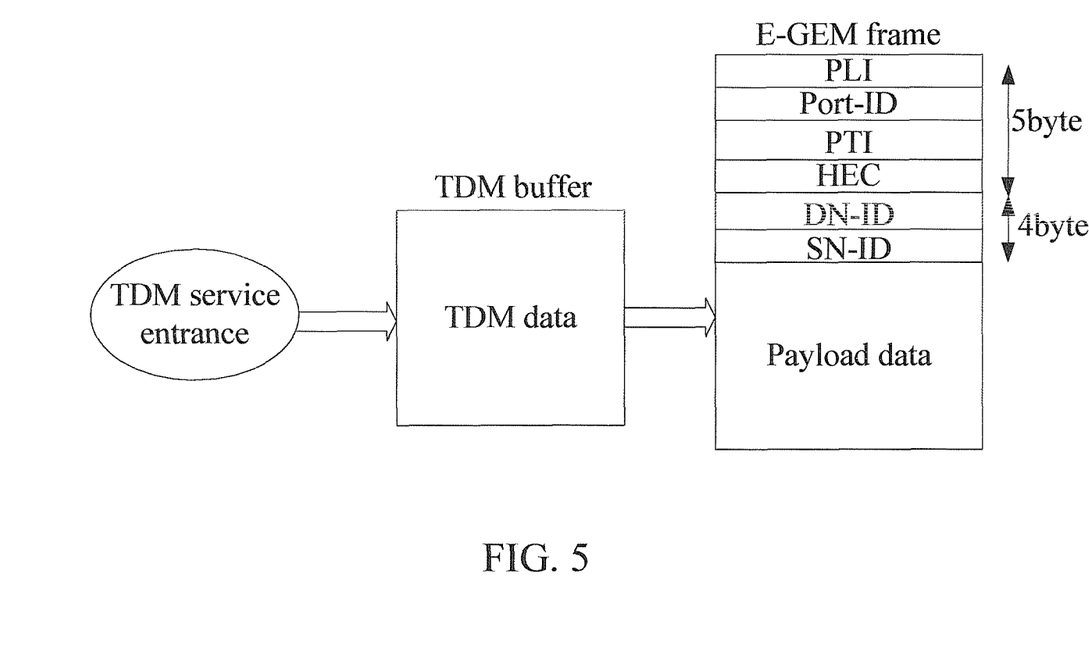
FIG. 5 is a schematic diagram of mapping a TDM service into an E-GEM frame according to an embodiment of the present invention.

FIG. 5 shows a schematic diagram of mapping TDM services into E-GEM frames.

For TDM service mapping, it can be self adapted and the value of the PLI can be adjusted within ±1 byte according to the difference between the rate of the TDM service itself and the rate of the E-GEM frame. Taking E1 service (2.048 Mbps signal) as an example, when the frame frequency is 8 KHz, and an E1 signal and an E-GEM frame are synchronized to each other, the value of PLI is fixed to 32 byte. When their clocks are different, i.e., when there is a frame difference between them, PLI can take one of the three values 31, 32, and 33. Since the value of PLI is counted in bytes, when the E1 signal is mapped to the data payload area of the E-GEM frame, the data buffer has to wait to adjust the value of PLI within ±1 byte every 8 bits, i.e., 1 byte.

Figure 6:
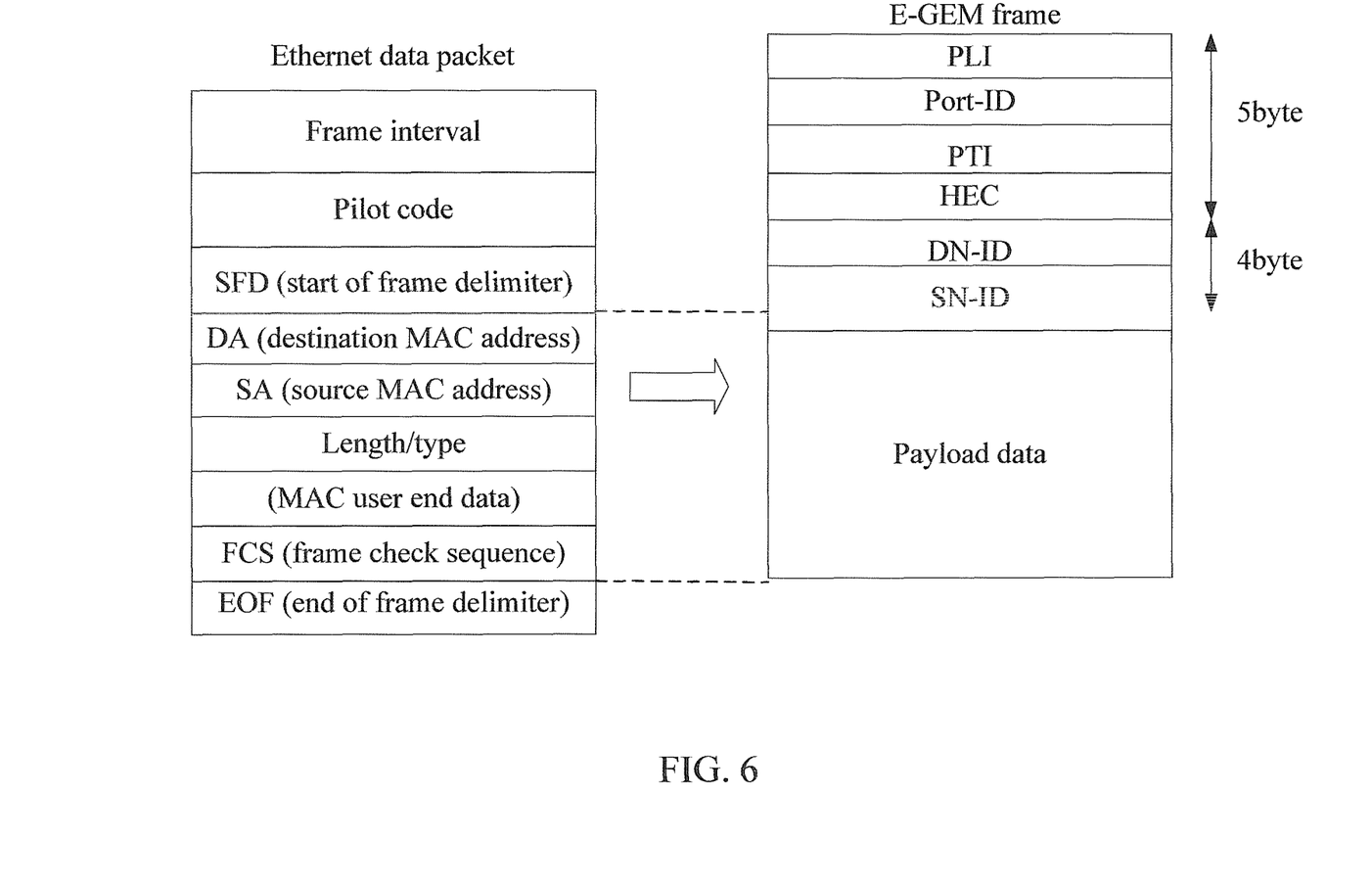
FIG. 6 is a schematic diagram of mapping an Ethernet service into an E-GEM frame according to an embodiment of the present invention.

FIG. 6 shows a schematic diagram of mapping Ethernet services into E-GEM frames.

The structure of the Ethernet frames is the same as that of the prior art and hence is omitted herein.

For mapping Ethernet services, an approach of discarding Ethernet frame interval and pilot code can be adopted to merely ensure the integrity of the Ethernet frame data. The length of an Ethernet frame can be determined from length/type domain of the Ethernet frame, plus that other fields of the frame have fixed lengths, and thus the PLI value can be determined. Then the Ethernet frame can be mapped to the data area of an E-GEM frame. When the length of an extremely long Ethernet frame exceeds 4095, it can be transmitted in fragments using multiple continuous E-GEM frames.

Figure 7:
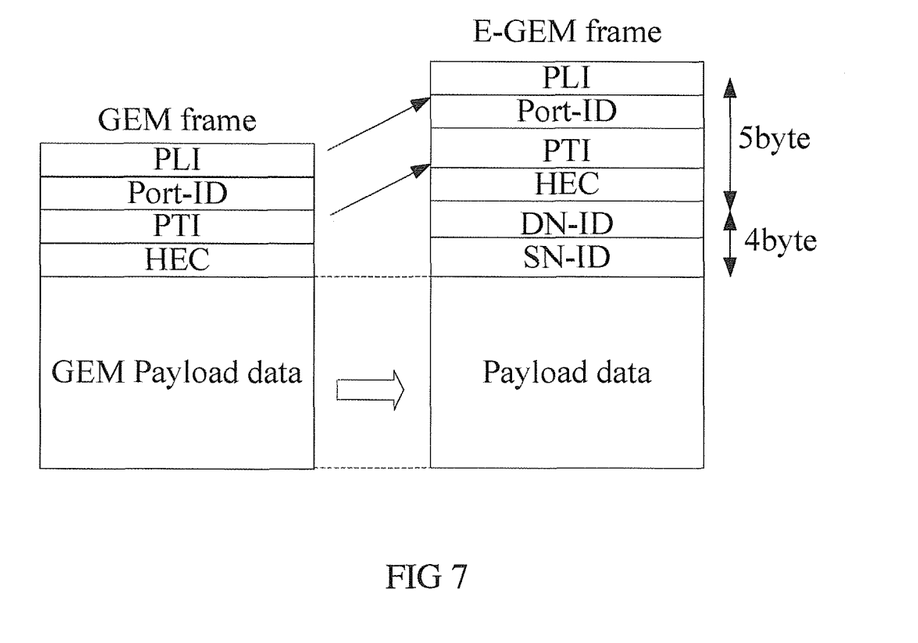
FIG. 7 is a schematic diagram of mapping a GEM frame of GPON architecture into an E-GEM frame according to an embodiment of the present invention.

FIG. 7 shows a schematic diagram of mapping a GEM frame of the GPON architecture to an E-GEM frame.

For mapping a GEM frame to E-GEM, as the Port-ID exists merely between GPON OLT and ONU, whereas the destination and source identifiers of the service are added to the E-GEM frame and the E-GEM frame is applied to wider network extent, such as metropolitan area, and the service identifier Port-ID is used along with a branch port identifier (TI-ID) and a network node identifier (Node-ID) to identify wider ranges of services within the network, the meaning of Port-ID has changed. Therefore, it is necessary to reassign a value for Port-ID and corresponding HEC check needs to be re-calculated. Other PLI and PLI values and payload data can be directly copied to corresponding domains in the E-GEM frame.

As can be seen from the above embodiments, compared with the traditional SDH architecture, the method for multi-service adaptation and carriage of the embodiments the present invention can achieve uniformly encapsulating various forms of services into E-GEM frames at the service adaptation layer. Each service type needs only one layer of E-GEM frame for adaptation, and then directly arrives at T-CONT frames at the channel layer. It does not need complex intertexture division multiplexing, thus greatly simplifying the intermediate processing. It is easy to implement and saves costs. Meanwhile, the structure of two layers of administrative cost is succinct and reasonable, capable of reflecting main alert and performance monitoring, simple and reliable, and convenient to implement. The length of data at the channel layer can be adjusted in the unit of one byte. The bandwidth utilization is high. Further, it can be combined with DBA mechanism and achieve dynamic bandwidth adjustment. The mechanism for achieving QoS is flexible and convenient.

Compared with the GPON architecture, it draws on the advantages of T-CONT frames in the GPON architecture, strengthens OAM function, can break the limitation of being used only within the range of the access layer and only in the upward direction, and can be expanded to broader applications, such as metropolitan range and supporting various types of networking form. Except for conveniently carriage TDM services and Ethernet services, it can be naturally interface with GPON signals and better support future development of FTTx.

A person of ordinary skill in the art can understand that part or all of the steps of the above method can be performed by programs instructing relevant hardware. The program can be stored in computer readable medium, e.g., ROM/RAM, magnetic disk, optical disk, etc.

Figure 8:
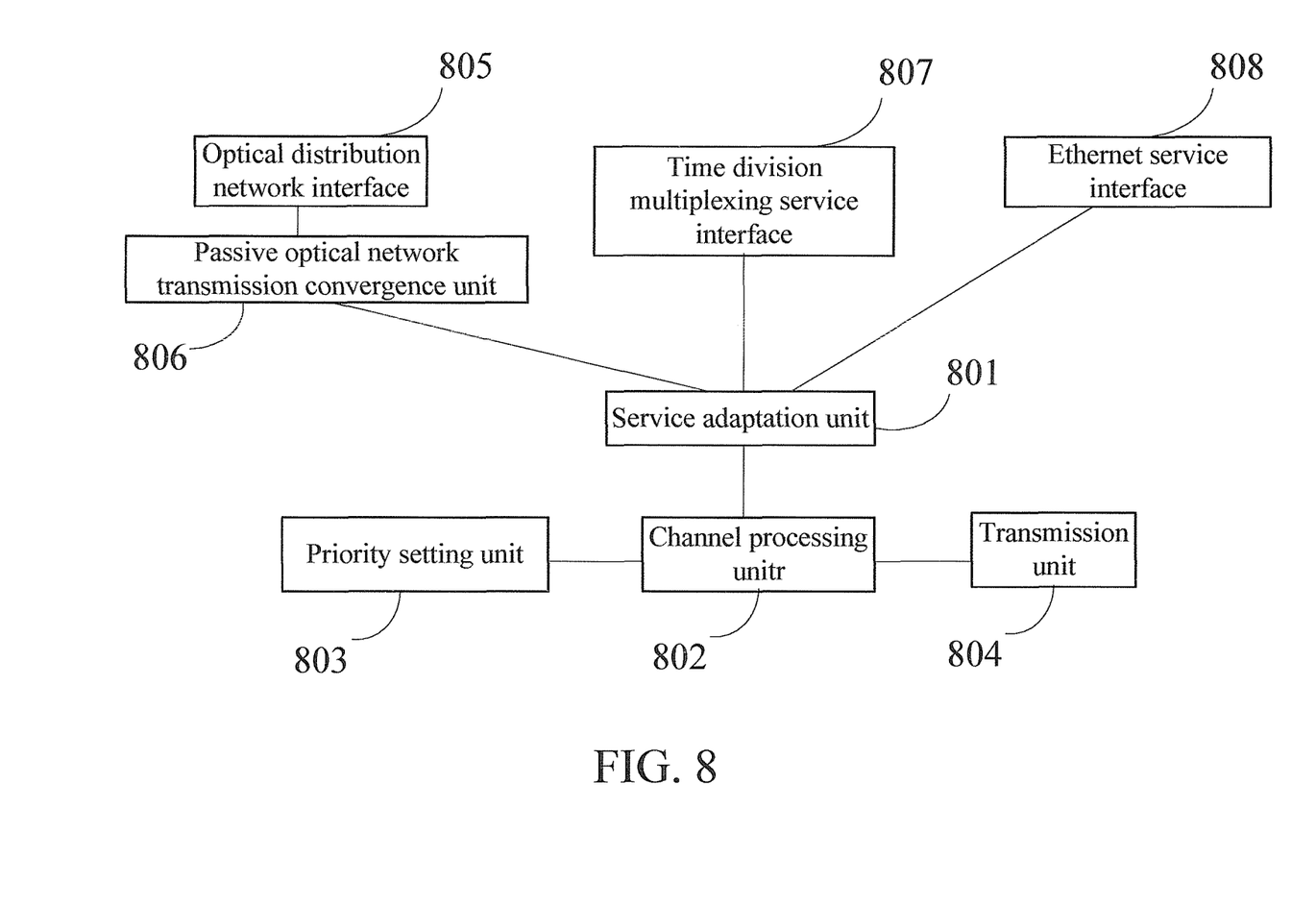
FIG. 8 is a schematic diagram of the structure of an apparatus for multi-service adaptation and channel carriage according to an embodiment of the present invention.

Referring to FIG. 8, it is a schematic diagram of the structure of an apparatus for multi-service adaptation and channel carriage according to the present invention.

The apparatus comprises a service adaptation unit 801, a channel processing unit 802, a priority setting unit 803, and a transmission unit 804.

The service adaptation unit 801 is configured to: at the service adaptation layer, encapsulate and decapsulate various types of service uniformly. The encapsulation includes mapping different types of services into uniform E-GEM frames. The channel processing unit 802 is configured to combine at the channel layer E-GEM frames encapsulating the same type of services into the same type of transport frame T-CONT. The priority setting unit 803 is configured to set priorities for the T-CONT. The transmission unit 804 is configured to guarantee bandwidth for T-CONT with high priority and preferentially send them.

A specific process for implementing service adaptation and channel carriage can be understood by referring to the previous description of the embodiments of the present invention, which is omitted herein.

To enable better interfacing of the apparatus of the embodiment of the present invention with various types of service equipment, as shown in FIG. 8, the apparatus of the embodiment of the present invention can further include an optical distribution network interface 805 and a passive optical network transmission convergence unit 806 to achieve interfacing with a GPON branch. The optical distribution network interface 805 is configured to receive gigabit passive optical network GPON signals. The passive optical network transmission convergence unit 806 is configured to de-encapsulate the GPON signal at the transmission convergence layer of GPON to GEM frames, and send the GEM frames to the service adaptation unit 801. Thus, the GEM frames are mapped by the service adaptation unit 801 to the E-GEM frames. The specific mapping process has been explained previously and is hence omitted herein.

In addition, the apparatus of the embodiments of the present invention can further include a time division multiplexing service interface 807 and/or an Ethernet service interface 808. The time division multiplexing service interface 807 is configured to receive time division multiplexing (TDM) service signals, such as commonly seen 64 Kbps signals, E1 (2048 Kbps signals), E3 (34.368 Mbps signals), T1 (1544 Kbps signals), T3 (44.736 Mbps signals), DS1 (1544 Kbps signals), DS3 (44.736 Mbps signals), and STM-1 (155.52 Mbps signals), and to send the TDM service signals to the service adaptation unit 801. The Ethernet service unit 808 is configured to receive Ethernet service packets and send the packets to the service adaptation unit 801 after discarding the frame intervals, and pilot codes in the Ethernet data packets.

It should be explained that in practice the above optical distribution network 805, the time division multiplexing service interface 807, and the Ethernet service interface 808 can be chosen according to actual networking needs; one or all of them can be selected. Of course, the apparatus of the embodiments of the present invention is not limited by these service interfaces. According to the same principle, other service interfaces can be conveniently considered. For example, T-MPLS and PBB-TE service signals can be encapsulated into Ethernet frames as client signals of the Ethernet architecture. Then, through two layers of switching or not through two layers of switching these signals can be mapped into E-GEM frames.

The apparatus for multi-service adaptation and channel carriage of the embodiments of the present invention can be used to uniformly encapsulate various types of service into E-GEM frames at the service adaptation layer, combine at the channel layer E-GEM frames encapsulating the same type of services into the same type of T-CONT frames, and conveniently meet QoS requirements of different services according to the priorities of the T-CONT types.

The embodiments of the present invention have been described in detail as above. Specific embodiments have been used to illustrate the present invention. The description of these embodiments is merely used for facilitating understanding of the system and method of the present invention. At the same time, for a person of ordinary skill in the art, the embodiments and their application scopes can be varied according to the idea of the present invention. To sum up, the contents of the description should not be construed as limitations to the present invention.

What is claimed is:

1. A method for multi-service adaptation and carriage, the method comprising:
    mapping at a service adaptation layer different types of service into Enhanced Gigabit Passive Optical Network Encapsulation Method (E-GEM) frames; wherein each of the E-GEM frames comprises a frame header, an address identifier, and payload data; wherein the frame header comprises a service identifier for indicating an identification that distinguishes the service in the each of the E-GEM frames from other services in a network; wherein the address identifier comprises a destination identifier for indicating a termination point of the service in the network and a source identifier for indicating a start point of the service in the network;
    grouping the E-GEM frames by the same type of service based on the respective service identifier, wherein the grouped E-GEM frames are encapsulated into the same T-CONT frame at a channel layer;
    setting a priority for each type of T-CONT frames; and
    guaranteeing bandwidth for T-CONT frames with high priority and preferentially sending the T-CONT frames with high priority; wherein each of the T-CONT frames comprises a frame header, a channel overhead, and payload data;
    wherein the frame header further comprises a length of payload and a header-error-check, wherein the header-error-check is used for checking data in the frame header to search for and synchronize the frame header;
    wherein the channel overhead comprises a channel identifier for indicating a serial number of the T-CONT frames, a data check for detecting quality of data transmission at the channel layer, and a monitoring field for conveying an alert and a performance detection result at the channel layer.

2. The method according to claim 1, wherein the channel overhead further comprises a dynamic bandwidth report for reporting dynamic bandwidth demand.

3. The method according to claim 1, wherein the different types of service include Time Division Multiplexer (TDM) services, Ethernet services, and Gigabit-Passive Optical Network (GPON) services.

4. A method for multi-service adaptation and carriage, comprising:
    mapping at a service adaptation layer different types of service into Enhanced Gigabit Passive Optical Network Encapsulation Method (E-GEM) frames; wherein each of the E-GEM frames comprises a frame header, an address identifier, and payload data; wherein the frame header comprises a service identifier for indicating an identification that distinguishes the service in the each of the E-GEM frames from other services in a network; wherein the address identifier comprises a destination identifier for indicating a termination point of the service in the network and a source identifier for indicating a start point of the service in the network;
    grouping the E-GEM frames by the same type of service based on the respective service identifier, wherein the grouped E-GEM frames are encapsulated into the same T-CONT frame at a channel layer;
    setting a priority for each type of T-CONT frames; and
    guaranteeing bandwidth for T-CONT frames with high priority and preferentially sending the T- CONT frames with high priority; wherein each of the T-CONT frames comprises a frame header, a channel overhead, and payload data;
    wherein the frame header further comprises a length of payload, a channel identifier for indicating a serial number of the T-CONT frames, and a header-error-check used for checking data in the frame header to search for and synchronize the frame header;
    wherein the channel overhead comprises a data check for detecting quality of data transmission at the channel layer, and a monitoring field for conveying an alert and a performance detection result at the channel layer.

5. The method according to claim 4, wherein the channel overhead further comprises a dynamic bandwidth report for reporting dynamic bandwidth demand.

6. The method according to claim 4, wherein the different types of service include Time Division Multiplexer (TDM) services, Ethernet services, and Gigabit-Passive Optical Network (GPON) services.

* * * * *